United States Patent [19]
Boyce

[11] 4,353,568
[45] Oct. 12, 1982

[54] PROGRAMMABLE STEERING CONTROL APPARATUS FOR MOTOR VEHICLES

[75] Inventor: William A. Boyce, Huntington Beach, Calif.

[73] Assignee: Macaster Controls, Inc., Huntington Beach, Calif.

[21] Appl. No.: 157,194

[22] Filed: Jun. 6, 1980

[51] Int. Cl.³ .............................................. B62D 15/02
[52] U.S. Cl. ..................................... 280/94; 280/268
[58] Field of Search ......................... 280/94, 268, 271; 267/150

[56] References Cited

U.S. PATENT DOCUMENTS

| | | | |
|---|---|---|---|
| 1,428,515 | 9/1922 | Beal | 280/94 |
| 1,519,046 | 12/1924 | Pewther | 280/94 |
| 3,448,991 | 6/1969 | Leggett | 280/94 |
| 3,961,804 | 6/1976 | Blanton | 280/94 |

FOREIGN PATENT DOCUMENTS

| | | | |
|---|---|---|---|
| 133973 | 9/1929 | Switzerland | 280/94 |
| 17707 | of 1910 | United Kingdom | 280/94 |

Primary Examiner—David M. Mitchell
Assistant Examiner—Ross Weaver
Attorney, Agent, or Firm—Allan R. Fowler

[57] ABSTRACT

Programmable motor vehicle steering control apparatus, which enables zero settings of front wheel caster, camber, toe-in and steering axis inclination, comprises left and right pairs of first and second, tangentially loaded helical spring elements and means for connecting the left pair of spring elements between a left front wheel steering arm and tie rod and the right pair of spring elements between a right front wheel steering arm and tie rod. Parallel connecting arms of each second spring element cross so that when either pair of spring elements in push or pull loaded during vehicle turns, the two spring elements in each pair act in opposite, spring coil opening or closing directions. The connecting means includes means for offsetting outboard ends of the spring elements in each pair and preloading means are provided for selectively preloading each of the spring elements. Together, the offsetting means and preloading means cooperate to enable non-symmetrical spring element loading and unloading in vehicle turns to provide, for example, greater spring restoring forces on outside wheels in a turn, according to required steering control and wheel return-to-center characteristics.

20 Claims, 16 Drawing Figures

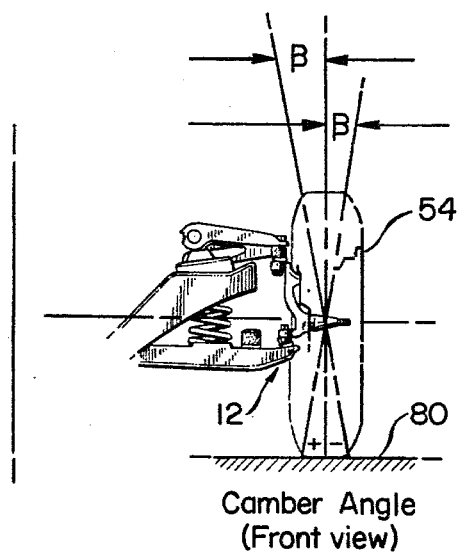
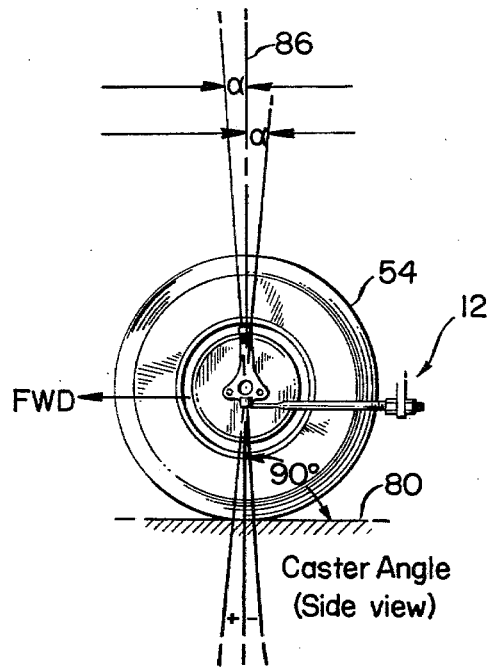
FIG. 2(b) Camber Angle (Front view)
FIG. 2(a) Caster Angle (Side view)
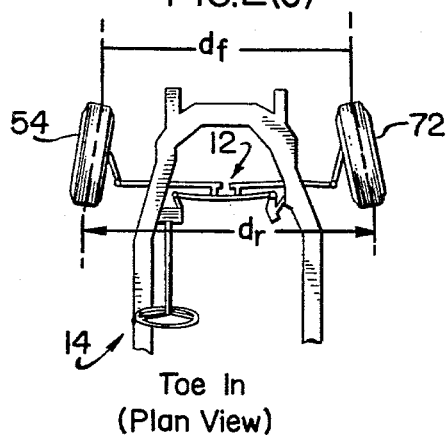
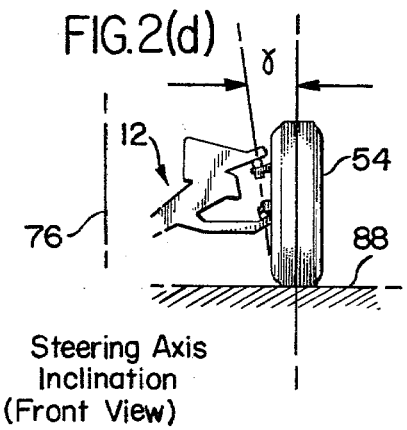
FIG. 2(c) Toe In (Plan View)
FIG. 2(d) Steering Axis Inclination (Front View)
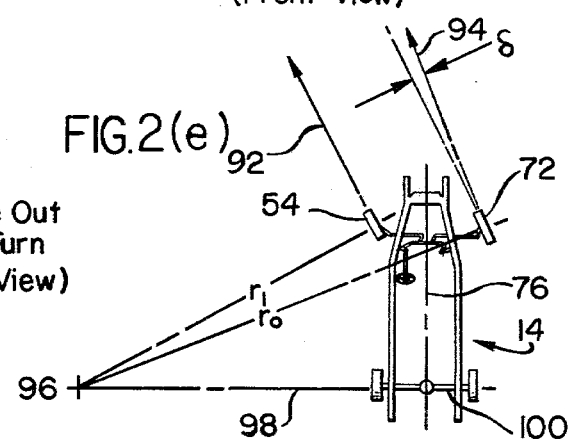
FIG. 2(e) Toe Out On Turn (Plan View)

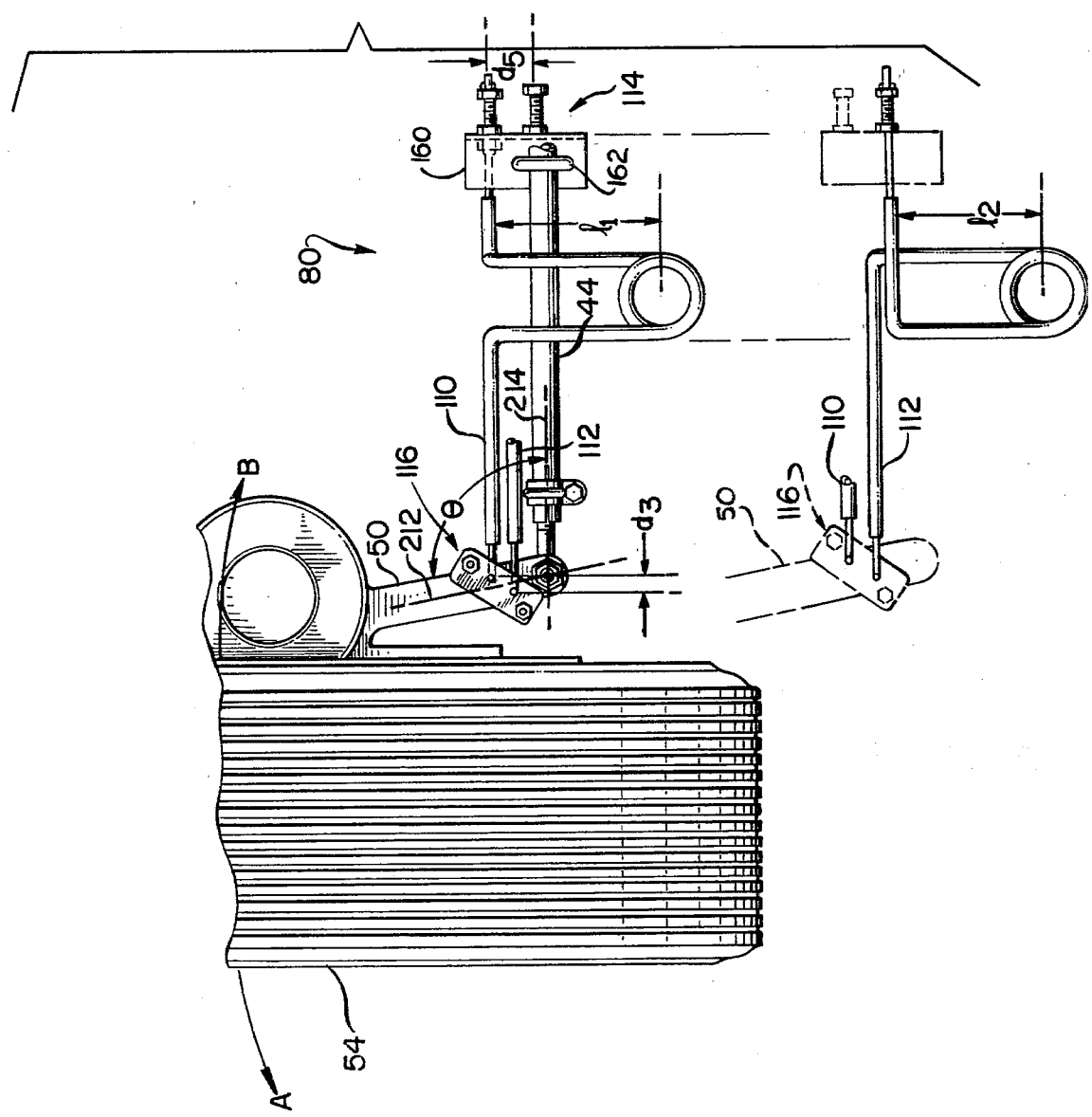

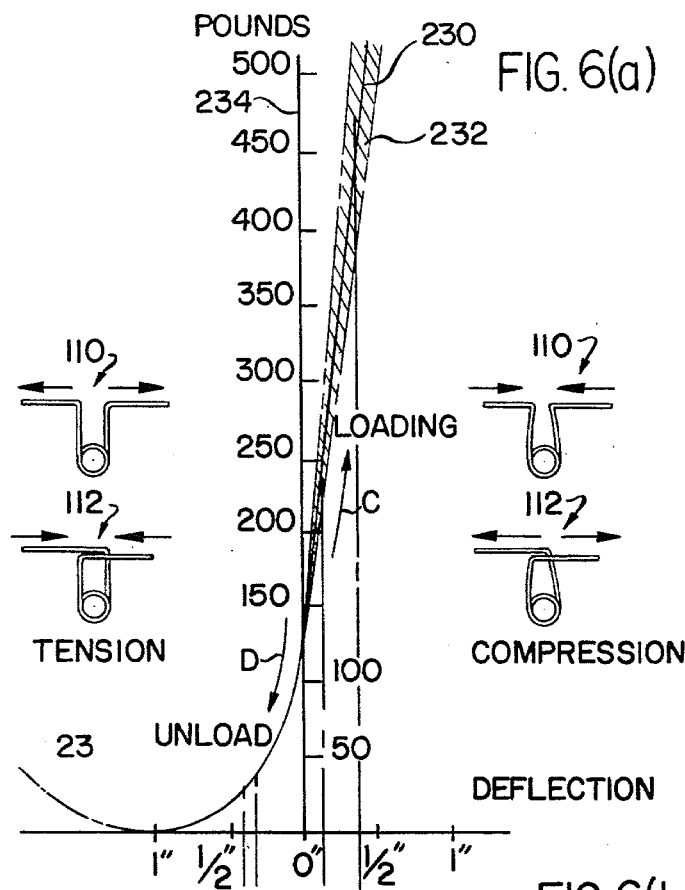
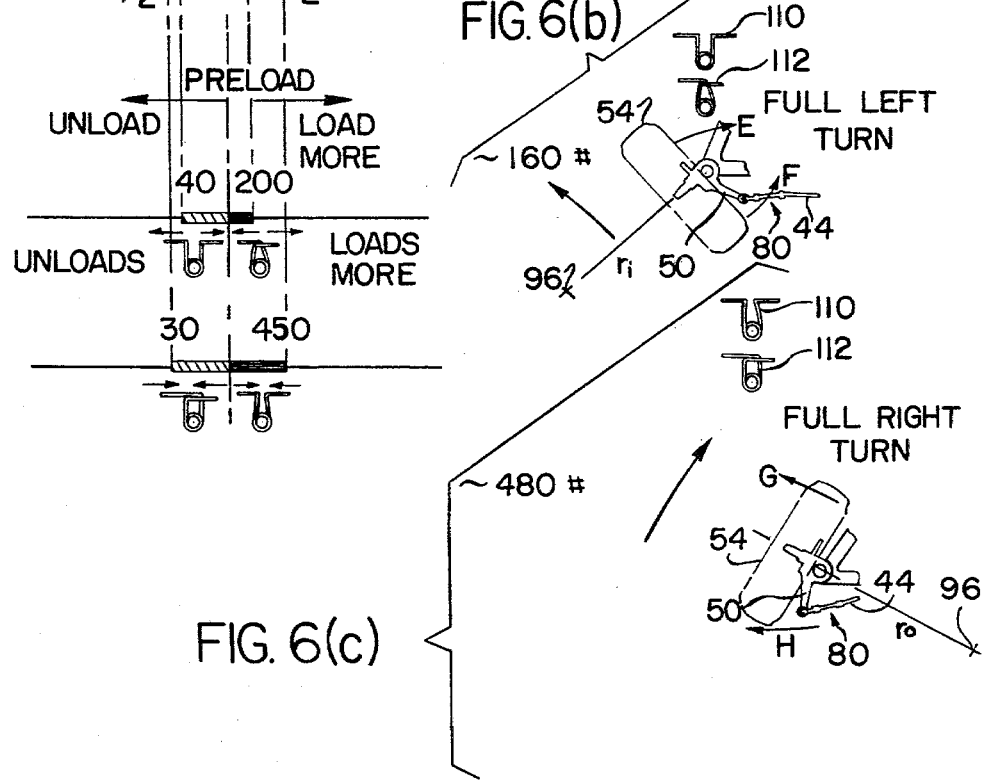

PROGRAMMABLE STEERING CONTROL APPARATUS FOR MOTOR VEHICLES

BACKGROUND OF THE INVENTION

1. Field of the Invention

The present invention relates generally to the field of motor vehicle steering control apparatus, and more particularly to motor vehicle front wheel steering stabilization and return-to-center apparatus.

2. Discussion of the Prior Art

Many problems have been, and still are, related to motor vehicle steering gear which converts rotational steering wheel movement into side-to-side swiveling of the steerable wheels, thereby enabling a driver to control direction of vehicle travel.

An important motor vehicle safety requirement is that the vehicle's steering gear enable the driver to maintain steering control of the vehicle, regardless of road conditions which tend to oppose driver control through direct interaction with the wheels. Safe vehicle operation also dictates that vehicle turning be quickly and accurately responsive to steering wheel movement, without under- or over-steering, with no steering dead zones and with vehicle turning proportional to steering wheel turning, all with uniform, easy steering wheel turning forces being provided throughout the vehicle turning range.

Another important vehicle safety requirement is that at any held steering wheel position, the vehicle should exhibit no tendency to wander; and that upon release of the steering wheel after a turn the vehicle, of its own accord, quickly resumes straight ahead travel. On uncrowned roads, the vehicle should travel straight ahead in a "hands off" condition, without veering to either side, unless specifically adjusted to do so, as may be required for some classes of vehicles.

In spite of these restrictions and requirements, the steering gear should be configured so that the driver retains a driving "feel" for the vehicle and a comfortable sense of vehicle responsiveness and control.

In addition to being extremely reliable in operation, the steering gear should, for cost considerations, be relatively simple and require comparatively low maintenance. And, since the steering operation depends upon tire-to-road frictional contact, the steering gear should not be a substantial factor in tire wear.

To these ends, early motor vehicles with nonindependent front wheel suspension used relatively simple linkage systems, generally operated by rack and pinion steering mechanisms, to pivot the steerable wheels in unison while maintaining, unlike horse drawn carriages, a fixed, non-pivoting axle.

More sophisticated steering gear was needed to meet subsequent steering requirement of heavier and faster motor vehicles with independent front wheel suspension. The steering gear of most motor vehicles now typically includes a steering column to which a driver operated steering wheel is attached and in lower regions of which a projecting arm, known as a pitman arm, is connected to a gear box to swing, generally from fore to aft as the steering wheel is turned.

At each steerable wheel, a "knuckle" assembly is provided which includes a wheel mounting spindle, means for attaching the assembly to the vehicle's suspension system, and a projecting steering knuckle arm or lever enabling swiveling of the knuckle, and hence the wheel, for steering purposes. Two tie rods, usually of equal length, are provided, each being pivotally connected, at a tie rod ball and socket end, to a corresponding one of the steering knuckle arms.

Opposite ends of the two tie rods are typically connected, in laterally spaced apart relationship, to intermediate regions of a transverse relay rod, one end of which is pivotally connected to the pitman arm. The other end of the relay rod is pivotally connected to an idler arm, which is, in turn, pivotally connected to the vehicle frame.

Fore-to-aft pivotal movement of the pitman arm, as the steering wheel is turned, is transmitted through the relay rod to the individual tie rods which, through the steering knuckle arms, cause corresponding side-to-side swiveling or steering of the steerable wheels.

The gear box which is connected between the steering wheel shaft and pitman arm provides a mechanical advantage in the range of about 10:1 to 30:1 to enable overcoming frictional resistance between the tires and road surfaces with reasonable driver effort. The mechanical advantage also substantially reduces tendency of the wheels, when encountering obstacles, road irregularities, etc., to steer the vehicle by pulling the steering wheel out of the driver's hands. As weight and maximum speed of vehicles have increased, some type of power steering, which substantially increases the mechanical advantage associated with manual steering, has been provided on a large percentage of vehicles.

Complete descriptions of modern vehicle steering gear construction and operation may be found, for example, in a book entitled "Automative Suspensions—Steering Alignment and Brakes", 5th Edition, by Walter Billet and Walter Alley, published by the American Technical Society, 1974.

Vehicle steering control, in accordance with such safety and driving requirements as mentioned above, is typically provided by various different static, angular adjustments of the steerable wheels. Most familiar of these wheel adjustments are caster, camber and toe-in; less familiar are steering axis inclination angle and toe-out in turns. Although description and effects of these various adjustments may be found in publications, for example, in the above referenced automotive book, several important aspects are summarized below.

Wheel caster is a measure of the fore-aft inclined angle at which the wheel steering knuckle is mounted to the wheel spindle. Such inclination is ordinarily such as to cause an axis through the knuckle pivot points to intersect the road surface ahead of a road surface intersection of a vertical centerline through the wheel, the caster in such case being considered positive. The separation between the two road surface intersection points is commonly referred to as the caster effect, and is responsible for the road-tire forces which cause directional wheel stability and tendency of the wheels to travel straight ahead.

Because the wheel spindle is attached to the steering knuckle, an effect of caster is that as the castered wheel is swiveled from side to side, the spindle sweeps through an inclined path. Thus, the front end of the vehicle is caused to rise and fall; the front end must be lifted as the wheel turns in and is lowered as the wheel turns out. Typically, for every 1° of caster, the front end of the vehicle rises about 3/16 inch at maximum wheel turn in. With equal caster provided on both front wheels, there is a tendency of front end weight to urge both the wheel towards a straight-ahead direction, as is desirable for "hands-off" steering. However, it also necessitates high steering wheel turning forces; thus, for heavy vehicles with several degrees of wheel caster, power steering is usually required.

Steering axis inclination is defined as lateral or transverse tilt of the steering knuckle, as opposed to the described fore-aft caster. Ordinarily the steering axis inclination angle is set so that an extension of the knuckle axis intersects the road surface in a vertical plane through the tire. This provides easy wheel pivoting during a turn. Due to orientation of steering axis inclination, the vehicle front end must be lifted when the wheels are swiveled in either direction from straight ahead. Since steering axis inclination acts in combination with caster, more vehicle front end lifting is required, in a turn, from the turned in wheel, causing non-symmetrical wheel loading during turns.

Camber is defined as sideways tilting of the steerable wheels from vertical, being measured when the wheels are in a straight ahead position. Positive camber occurs when the wheel top is titled outwardly, and is usually provided. Negative camber occurs when the wheel top is inwardly titled. Since camber, in effect, makes a cone of the steerable wheels, the two steerable wheels try to swivel in opposition, causing the vehicle to travel in a straight line when the camber on each wheel is the same. However, with positive camber, outside portions (in respect to the turn) of the tire tread must travel faster than vehicle speed, thereby causing abrasive tread slipping and increased tire wear. From a tire wear standpoint.

Taken in combination with caster angle, the camber angle changes as the wheel swivels, the camber angle being reduced when the wheel is turned out and being increased when the wheel is turned in. This occurs even for zero camber with the wheels straight ahead. Because of caster-camber interaction, tire tread wear is increased and tire forces imparted by the road surface are non-symmetrical during turns, thereby tending to reduce steering control.

The point of intersection (of the knuckle center line, the wheel vertical center line and steering axis centerline) depends upon camber, steering axis inclination, tire radius and distance between the wheel and the steering knuckle pivot points. When the point of intersection is located below the road surface, the wheels tend to toe-out, when located above the road surface, the wheels tend to toe-in. If the point of intersection is just at the road surface under straight ahead conditions, the point of intersection, which tends to shift during turns, may, at some points, be above the road surface and at others be below the surface, alternatingly causing toe-in and toe-out tendencies, uneven wheel loading and steering control degredation.

Wheel toe-in occurs when front regions of the two front wheels are closer together than are rear portions thereof. Toe-out occurs when the front regions are further apart than rear regions. Because natural tendency of positive castered wheels is to try to turn out, and since tolerances and wear of steering gear pivot points tends to permit such toe-out, most front vehicles are provided with slight tie-in under static conditions, typically from about 1/16 to ⅛ inch. Any amount toe-in (or toe-out) however, causes increased tire wear since sideways tread slipping must occur as the tire rolls along a road surface.

Differences in angles, from straight-ahead, between the two front wheels during a turn is known as "toe-out on turn". This difference in angle, which is typically about 2-3 degrees, occurs because each wheel is at a different distance and is ordinarily on a different radius line from the center of turning point. Toe-out on turn, which causes tire dragging around turns, resulting in increased tread wear, is largely determined by vehicle configuration but is also affected by caster, camber, toe-in and steering inclination.

From the foregoing, it can be appreciated that the interaction among the mentioned adjustments of caster, camber, toe-in, etc. is complex, certain adjustments tending to provide enhanced steering control in some wheel positions but often reduced steering control in other wheel positions. Thus "fine turning" of all the adjustments is necessary to maximize steering control at all wheel positions. If one of the factors becomes out of adjustment, tendencies of the vehicle front wheels to "shimmy", for the vehicle to "wander" along the road or to pull to one side commonly occur.

In most of such out-of-adjustment situations, tire tread wear is particularly accelerated, in often characteristic wear patterns. However, these adjustments, even when properly made to maximize steering control, result in tire wear which is substantially increased, due to tire drag through turns, tread side angle slipping, etc., over that which would be expected to occur with zero amounts of adjustment and with the tires rolling without slipping, dragging, and the like.

Recognizing the relationship between the different mentioned wheel adjustments for steering control and accelerated tire wear, trade-offs are usually also necessary between steering control and tire wear when determining the adjustments to be made. Thus, some steering control must be sacrificed to enable reasonable, although far from maximum, tire life.

It is significant, also, that the tire tread slipping, over speeding, and the like, which is a result of front wheel adjustments to provide driving control and vehicle stability, actually tend to cause a dangerous reduction in steering control and stability in many turn conditions.

Coupled with the typically complex and often unpredictable interaction between the various wheel adjustment factors mentioned in relatively sharp turns at moderate or high speeds, the tread distortion, slipping and shifted centers of road engagement caused by these adjustments causes significant reduction of tire traction when traction is needed most. This effect of reduced tire tread traction is particularly dangerous if the road surface is wet, oily, icy or otherwise slippery.

Improved traction in such situation may often be achieved by use of wide, low, pressure tires which are in current common usage. However, with wider tires with more tread in pavement engagement, more unwanted tread movement as a result of caster, camber, etc. tends to occur. Thus, improvement in traction tends to be less than should be expected and tire wear tends to be more pronounced. In addition, gasoline economy tends to be decreased by use of wide low pressure tires which typically have increased frictional rolling contact with the pavement.

Attempts to provide auxillary vehicle steering control, typically in conjunction with existing caster, camber, toe-in, etc. adjustments have frequently been made. For example, in the several years preceeding about 1927 a number of United States patents were granted for add-on, spring-type apparatus for motor vehicle steering gear. These patents, most of which were intended to improve steering stabilization, are exemplified by those Thus, when either the left pair or the right pair of spring elements are subjected, in turns, to simultaneous push or pull forces, the two spring elements tend to act in opposition. As a result, by preloading the first spring elements sufficiently in a pushing-coil closing direction and the second spring elements sufficiently in a pulling, coil closing direction, the preloading means enable, in any turn of the steerable wheels, one of the left pair of spring elements and one of the right pair of spring elements to partially unload from preloaded levels thereof and the other ones of the left and right pairs of spring elements to load more heavily from preloaded levels thereof, all of the spring elements being enabled to always operate in a coil closing mode. This is, in any turn, causing unloading of the spring elements, the preloading can be such that complete unloading does not occur.

By controlling loading and unloading of the spring elements in turns by the offsetting means and preloading means, for any given configuration of the spring elements, wide variations in vehicle steering control and wheel return-to-center characteristic can be achieved, according to vehicle requirements, with zero settings of steerable wheel caster, camber, toe-in and steering axis inclination. Also in a turn, greater outside wheel spring restoring forces compensating for tie rod joint tolerances and wear, can be provided than is provided to the inside wheel, as is desirable to counter the greater road forces transmitted to the outside wheel. Preferably the outside wheel spring restoring force in any turn is at least about twice as great as the inside wheel spring restoring force.

Thus, improved steering control is provided by the programmable steering control apparatus while eliminating wheel caster, camber, toe-in and steering axis inclination and the problems, such as control instabilities and accelerated tire wear associated therewith.

BRIEF DESCRIPTION OF THE DRAWINGS

A better understanding of the present invention may be had from a consideration of the following detailed description, taken in conjunction with the accompanying drawings in which:

FIG. 2 is a pictorial diagram depicting conventional motor vehicle front wheel alignment characteristics, FIG. 2a depicting positive and negative wheel caster, FIG. 2b depicting positive and negative wheel camber, FIG. 2c depicting front wheel toe-in, FIG. 2d depicting steering axis inclination and FIG. 2e depicting outside wheel toe-out on turn;

FIG. 5 is a pictorial diagram showing, in simplified schematic form, the left wheel portion of the apparatus shown in FIG. 3 before preloading and with the associated front wheel in a straight-ahead position;

FIG. 6 is a pictorial diagram showing loading of the left wheel portion of the apparatus, FIG. 6a showing load characteristics of springs associated with the apparatus, FIG. 6b showing spring loading and unloading for a full left turn and FIG. 6c showing spring loading and unloading for a full right turn;

DESCRIPTION OF THE PREFERRED EMBODIMENT

Figure 1:
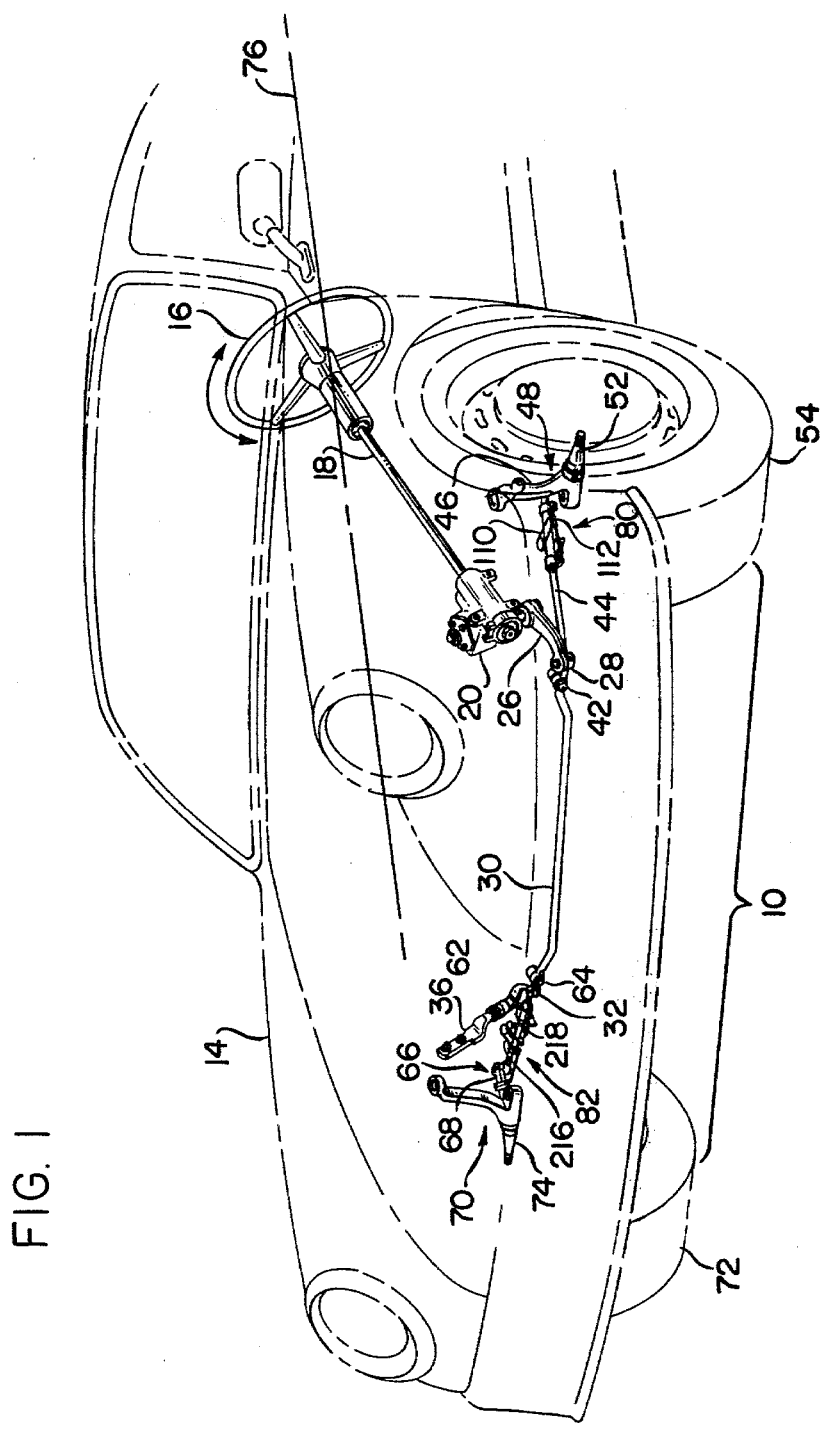
FIG. 1 is a perspective drawing, partially in phantom, showing programmable steering control apparatus, according to the present invention, installed on preexisting steering gear of an exemplary motor vehicle with steerable front wheels.

In FIG. 1, programmable steering control apparatus 10, according to the present invention, is shown installed onto typical, preexisting steering gear 12 of an exemplary front wheel steerable motor vehicle 14. As conventionally used herein, the term "steering gear" applies to the entire vehicle steering mechanism. As such, the steering gear includes a driver operated steering wheel 16 connected, by a steering shaft 18, to a gear box 20 which provides the necessary mechanical advantage for easy vehicle steering by the driver. An arm 26, commonly known as a pitman arm, extending from the gear box 20 pivots or swings in a generally fore-aft direction as the steering wheel 16 is turned in either direction through the vehicle steering range.

A projecting end of the pitman arm 26 is pivotally connected, at a ball joint 28, to one end of a transverse relay rod or drag link 30. To an opposite end of the relay rod 30 is pivotally connected, at another ball joint 32, one end of an idler arm 34, the other end of which is pivotally connected, at a bracket 36, to vehicle frame portions (not shown). The pitman arm 26 and the idler arm 34 are usually of similar lengths; the idler arm rotating through a partial turn as the relay rod 30 is moved in a transverse direction by pivotal action of the pitman arm in response to turning of the steering wheel 16.

Pivotally connected, at a ball joint 42, near a left hand (as referred to a driver of the vehicle 14) end of the relay rod 30 is a left, or left hand, tie rod 44. An outer end of the tie rod 44 is pivotally connected, at a tie rod ball joint 46, to a steering knuckle assembly 48. Comprising the steering knuckle assembly 48 is a steering knuckle arm 50 fixed to a wheel spindle 52. A left front wheel 54 is shown mounted on the spindle 52.

In a similar manner, a right or right hand tie rod 62 is pivotally mounted at a ball joint 64, to a right hand end region of the relay rod 30. A right hand tie rod ball joint 66 connects an outer end of the right tie rod 62 to a right steering arm 68 associated with a right steering knuckle assembly 70. A right wheel 72 is shown mounted on a wheel spindle 74 of the right knuckle assembly 70.

As is well known, rotational movement of the steering wheel 16 by a driver is converted, by the steering gear 12, into side-to-side swiveling or pivotal movement of the front steerable wheels 54 and 72, directional turning of the vehicle 14 being thereby enabled.

Comprising the programmable steering control apparatus 10, as more particularly described below, are left and right control steering portions 80 and 82, respectively, which are constructed symmetrically in respect to one another about a vertical plane through a longitudinal vehicle centerline 76. The left steering portion 80 is connected between the left tie rod 44 and the left to Fitzgerald (U.S. Pat. No. 1,121,818), Miller (U.S. Pat. No. 1,144,771), Huffman (U.S. Pat. No. 1,378,542), Pewther (U.S. Pat. Nos. 1,519,046 and 1,569,018), Cambell (U.S. Pat. No. 1,577,821), Stevens (No. 1,648,627) and Cavanagh (1,653,944).

Such patents typically disclose springs disposed between different pairs of steering gear elements, frequently for taking up manufacturing tolerances or wear in pivot connections between the elements and thereby reduce "play" in the steering system.

The number and general similarity of patents in this general group may be explainable by the fact that automobiles had, by the 1920's became more prevalant, their speed capabilities and size had increased, and better performance was expected, although roads had not yet been universally paved.

Also, by that time period, more women were driving and easier driving control was necessary to be consistent with general lesser strength of women drivers. A common tendency of cars of that era on rough, unpaved roads, was that when frequent ruts, potholes, rocks, etc., were hit by the front wheels, the steering wheel was frequently voluntarily torn from the drivers grasp, often with resulting injury to the driver.

With more universal road macadamizing or paving in this country occurring during the late 1920's, any popularity or, possibly, necessity of such auxillary, spring-type apparatus appears to have faded, and no further patents appear to have been granted on such apparatus, until the late 1960's when similar patents were granted, for example, to Leggett (U.S. Pat. No. 3,448,991) and Hefren (U.S. Pat. Nos. 3,848,845 and 3,980,315).

A common deficiency, however, of all such auxillary, spring-type add-on apparatus know to the applicant for improving steering stability of motor vehicles is that the apparatus were designed for improving vehicle steering control which was already provided to some extent by conventional caster, camber, toe-in, etc. adjustments. Although steering control and vehicle stability might be improved by installation of the add-on apparatus, the basic problems of steering instability by irregular and slipping tire engagement with the road surface during turns and excessive tire wear were generally not addressed or solved.

To overcome these and other problems, applicant has invented programmable-type vehicle steering control apparatus for adding onto preexisting steering gear, the apparatus providing for superior steering control while eliminating caster, camber, toe-in and steering axis inclination.

As a result, the steerable wheels of vehicles on which applicant's apparatus is installed roll freely through turns with virtually no tire tread distortion or slipping and with consequent greatly improved tread-to-road surface engagement and traction. Because lifting of the front end during turns is eliminated by elimination of wheel caster, driver steering forces are substantially reduced throughout the vehicle turning range and power steering, with its attendant costs and weight, is ordinarily unnecessary and can be eliminated.

Vehicle gas mileage is improved by applicant's steering control apparatus not only by reduction of front tire frictional losses but also by enabling higher air pressure in the front tires without sacrificing steering control and ride quality. As a result, tire life is also expected to be greatly improved, typically by as much as 30-50 percent, with no adverse side effects.

Additionally, front end and vehicle life is expected to be significantly increased due to reduced shock and vibration. Battery life is also expected to be improved, due to less oxide being broken loose from the battery plates by shock and vibration.

SUMMARY OF THE INVENTION

Programmable steering control apparatus, according to the present invention, for motor vehicles having steering gear which includes a plurality of steering linkages interconnected between a steering wheel or the like and one or more steerable wheels comprises spring means adapted for causing steering control and steerable wheel return-to-center biasing, the spring means including first and second spring elements. Means are provided for attaching the first spring element between an adjacent pair of the vehicle steering gear linkages and for attaching the second spring element between an adjacent pair of vehicle steering gear linkages, the attaching means including offsetting means enabling non-symmetrical spring element deflection during opposite turns of the steerable wheels. Included are means for preloading the spring elements to selected, separate preload levels enabling, in any turn of the steerable wheels, one of the spring elements to partially unload from the preloaded level associated therewith and the other one of the spring elements to load more heavily from the preload level associated therewith.

The offsetting means and the preloading means, which enables either compression or tension preloading of the spring elements, cooperate for selectively enabling the amount of unloading of one spring element in a given amount of turn of the steerable wheel in one direction to be unequal to the amount of greater loading of the same spring element for the same amount of steerable wheel turn in the opposite direction. Thus, for example, greater spring restoring forces can be provided at the outside wheel of a turn to counter tendency of the outside wheel to "bulldoze" as a result of normal "toe-out on turn".

Preferably, the attaching means attaches both the spring elements, in parallel, between the same pair of steering gear linkages. Still more preferably, the spring means comprises left and right pairs of the first and second spring elements, the attaching means attaching the left pair of first and second spring elements, in parallel, between a left steering arm and left tie rod associated with a left steerable wheel and the right pair of first and second spring elements between a right steering arm and tie rod associated with a right steerable wheel. In such manner, the left pair of spring elements tend to control the left wheel and the right pair of springs tend to control the right wheel.

More particularly, each of the first spring elements is formed having tangentially loaded, helical spring coils with attachment ends connected thereto. The first spring element attachment ends are configured to cause opening of the coils in response to the ends being pulled apart and closing of the coils in response to the ends being pushed together.

Similarly, each of the second spring elements are formed having tangentially loaded, helical spring coils with attachment ends connected thereto. However, the second spring element attachment ends are configured by crossing over one another to cause closing of the coils in response to the ends being pulled apart and opening of the coils in response to the ends being pushed together.

steering arm 52, across the left tie rod joint 46. Similarly, the right steering control portion 82 is connected between the right tie rod 62 and the right steering arm 68, across the right tie rod joint 66. Thus, the left steering control portion 80 functions to particularly control the left wheel 54 and the right steering control portion 82 functions to particularly control the right wheel 72; although, both the control portions importantly cooperate in providing steering control of the vehicle 14.

An important advantage of the programmable steering control apparatus 10 described herein is that good steering control of the vehicle (for example, the vehicle 14) on which the apparatus is installed is provided with greatly improved vehicle steering performance, handling and safety with zero settings of front wheel caster, camber, toe-in and steering axis inclination, as hereinafter defined in conjunction with FIG. 2. Enabling such zero adjustments adds substantially to vehicle stability and control, and greatly improves front wheel traction and increases tire life.

By way of definition, and as is apparent from FIG. 2a, to achieve zero caster, an angle, $\alpha$, between a ball joint center line 84 of the steering knucle (not shown) and a vertical center line 86 of the wheel (for example, the wheel 54) is set at zero degrees. For zero wheel camber (FIG. 2b), the vertical center line 86 is orthogonal to a road surface 88. That is, an angle, $\beta$, between the center line 86 and a normal to the surface 88 is set to zero degrees. As seen in FIG. 2c, with zero toe-in, a distance, $d_f$, between front centers of the wheels 54 and 72 is set equal to a corresponding distance, $d_r$, between rear centers of the wheels. Zero steering axis inclination (FIG. 2d) is achieved when an angle, $\gamma$, between a steering axis 90 through connecting ball joints of the steering knuckle (for example, the knuckle 48) and the wheel centerline 86 is set equal to zero degrees.

For purposes of the ensueing discussion, "toe-out on turns" is depicted in FIG. 2e. An angle, $\delta$, defining the toe-out on turns, is the angle between a vertical centerline plane 92 through the inside wheel (for example, the wheel 54) in a turn and a vertical centerline 94 through the outside wheel (for example the wheel 72) of the turn. The angle, $\delta$, results from radii $r_i$ and $r_o$ to respective centers of the inside and outside wheels 54 and 72 from a common center of turning 96 not being coincident, the angle between the wheel radii $r_i$ and $r_o$ being also equal to the toe-out on turns angle. As seen in FIG. 2e, the outside wheel radius line, $r_o$, is closer than the inside wheel radius, $r_i$, to a center line 98 through a rear vehicle axle 100, on which centerline lies the center of turn 96. It can thus be seen that the toe-out on turns angle, $\delta$, is largely a function of vehicle geometry and tightness of turns; although, it is also a function of wheel caster, camber, etc.

Figure 3:
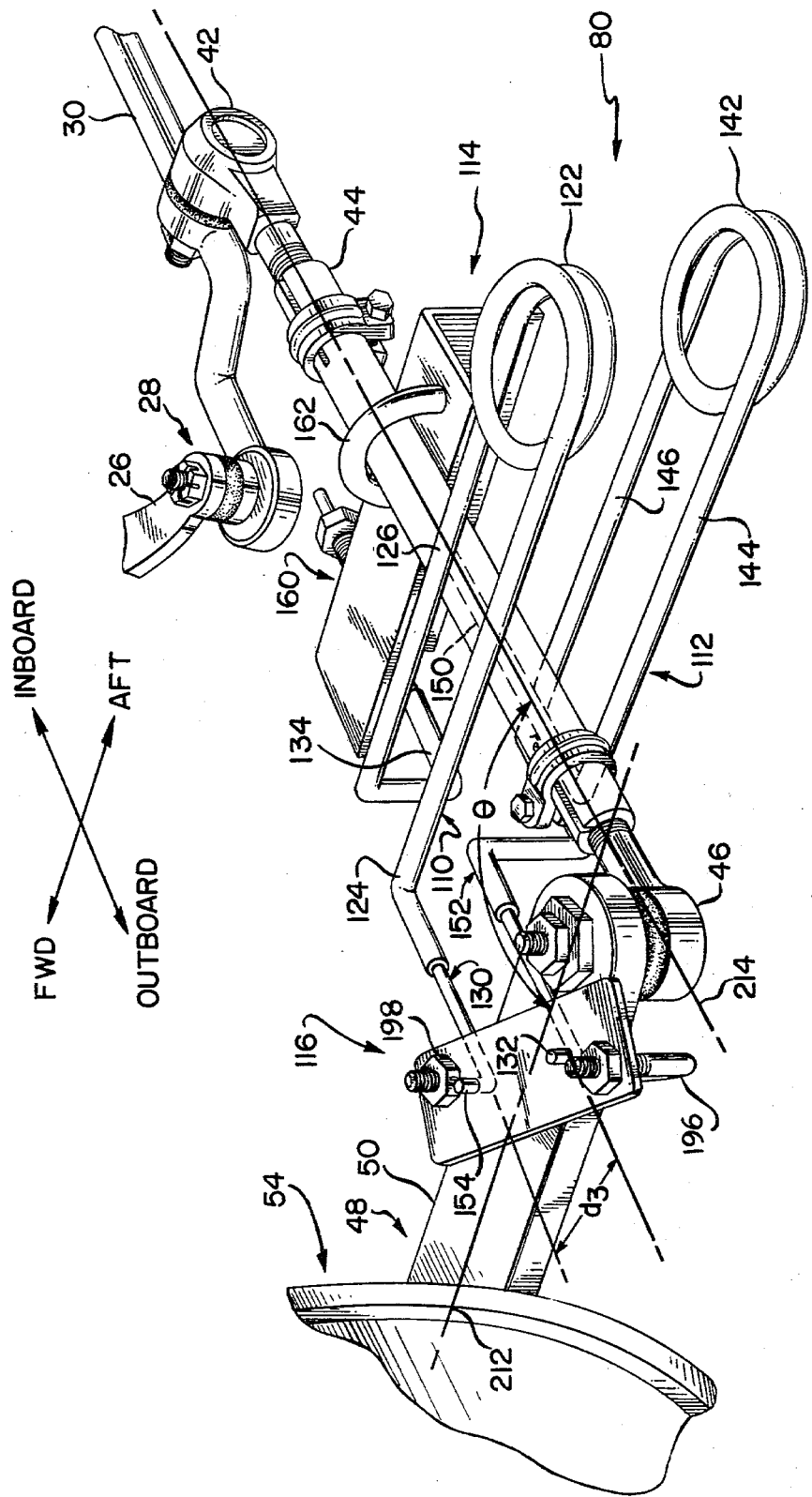
FIG. 3 is a partial perspective drawing showing a left front wheel portion of the programmable steering control apparatus of FIG. 1 adjustably installed between a left wheel steering knuckle arm and an associated tie rod connected thereto.
Figure 4:
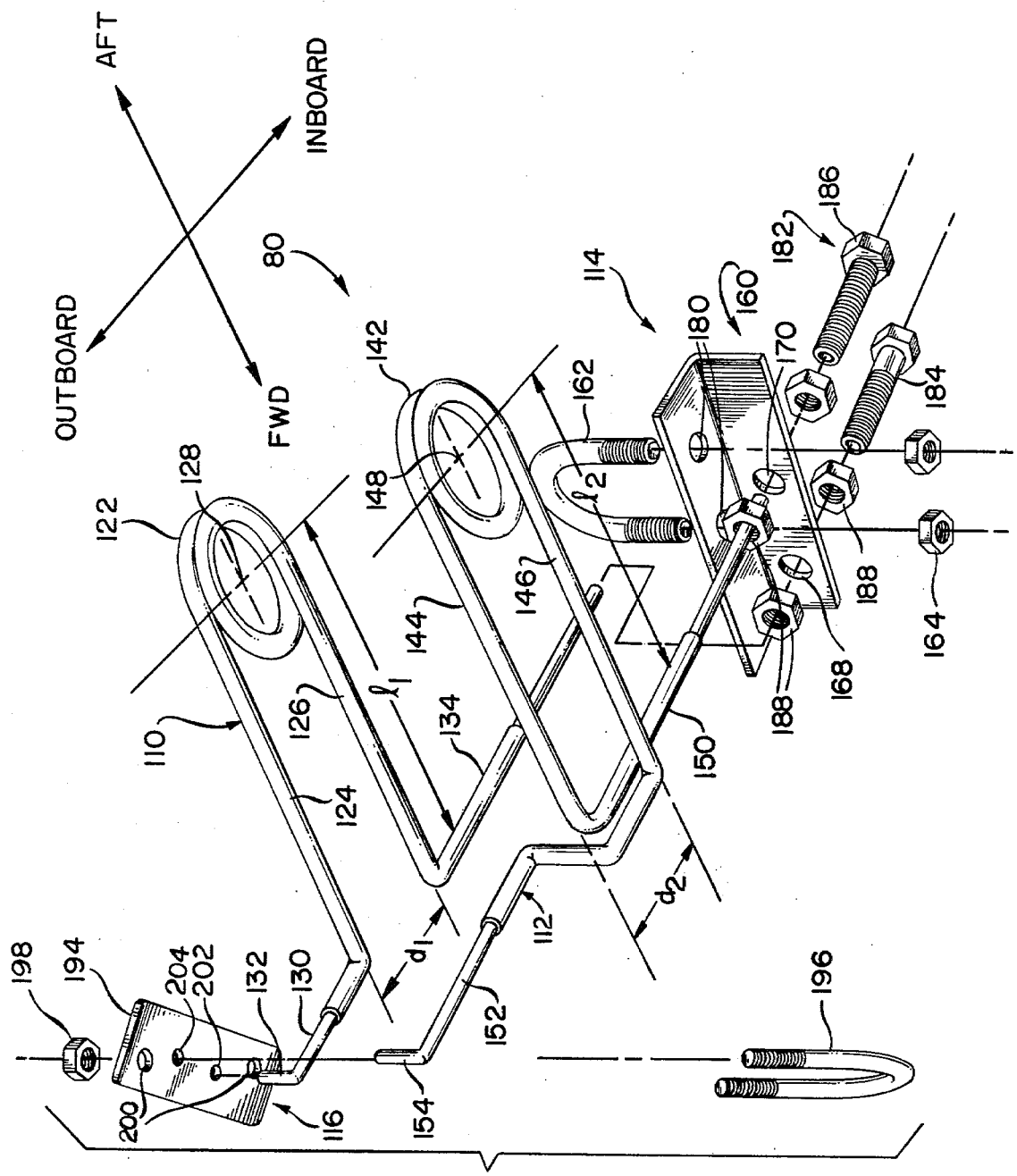
FIG. 4 is an exploded perspective drawing of the apparatus left wheel portion shown in FIG. 3, showing features thereof.

More particularly described and as seen in FIGS. 3 and 4, the left steering control apparatus portion 80 comprises first and second helically wound spring elements 110 and 112, respectively. For reasons which will become apparent, the first spring 110 may be referred to as a "push" spring; whereas, the second spring 112 may be referred to as a "pull" spring. Inboard spring mounting or connecting means 114 are provided for connecting inboard ends of the spring elements 110 and 112 to the associated tie rod 44; outboard mounting or connecting means 116 are similarly provided for connecting outboard ends of the spring elements to the associated left wheel steering arm 50.

Comprising the first, push spring element 110 is a tangentially loaded, helical spring portion 122, from opposite side regions of which forwardly extend parallel, outboard and inboard lever arms 124 and 126, respectively. Preferably, both the arms 124 and 126 have an equal length, $l_1$, as measured from a center 128 of the spring portion 122. An outwardly projecting, transverse arm 130, formed at right angles to a forward end of the outboard lever arm 114, terminates in a short, bent-up mounting end 132. Joined at right angles to a forward end of the inboard lever arm 126 is an inwardly projecting transverse arm 134. Assumingly equal lengths, $l_1$, of the lever arms 124 and 126, the transverse arms 132 and 134 are preferably in general transverse alignment with one another.

Axially pushing or compression on one or both of the first element transverse arms 130 and 134 acts to close coils of the helical spring portion 122 and decrease a separation, $d_1$, between opposing adjacent ends of the transverse arms. Conversely, axially pulling or tension on the transverse arms 130 and 134 opens the spring coils and increases the arm separation distance, $d_1$.

As more fully discussed below, since spring characteristics of the push spring element 110 can be expected to be at least somewhat different in the transverse arm "push" and "pull" modes of operation, the spring element is preferably connected between the tie rod 44 and the steering arm 50 and is preloaded so that it always operates in only the push mode. Thus, the two lever arms 124 and 126 are never permitted to reach the unloaded, initially parallel relationship.

Configuration of the second, pull spring element 112 is relatively similar to that described above for the push spring element 110. Accordingly, the spring element 112 comprises a tangentially loaded, helical spring portion 142 formed having outboard and inboard, forwardly projecting lever arms 144 and 146, respectively which are parallel in an unloaded condition. A length, $l_2$, of both the lever arms 144 and 146, from a center 148 of coils of the spring portion 142, is preferably equal to the length, $l_1$, of both the push spring lever arms 124 and 126.

Orthogonally projecting in an inboard direction from the outboard lever arm 144 is a transverse arm 150. Projecting in an opposite, outboard direction from the inboard lever arm 146 is a transverse arm 152. Thus, unlike the first, push spring transverse arms 130 and 134, the second pull spring transverse arms 150 and 152 overlap for a distance, $d_2$, equal to unloaded spacing between the lever arms 144 and 146. A short end 154 of the outboard arm 152 is bent up at 90° for mounting purposes.

It can be seen from FIGS. 3 and 4 that pulling on one or both of the pull spring transverse arms 150 and 152 has the same effect as pushing on the push spring transverse arms 130 and 134; that is, the separation, $d_2$, at the ends of the lever arms 144 and 146 is decreased. The pull spring element 112 is preferably connected between the tie rod 44 and the steering arm 50, and preloaded, as described below, so that it is always operated in a pull mode.

Connection of inboard ends of the spring elements 110 and 112 to the tie rod 44 is by a rigid metal bulkhead fitting 160 adjustably connected across the tie rod by a U-bolt 162 and locknuts 164. Formed through a vertical leg 166 of the fitting 160, in fore-aft spaced apart relationship, are first and second apertures 168 and 170 for receiving, respectively, inboard end regions of the inboard spring element arms 134 and 150. Through a horizontal fitting leg 176 are formed apertures 178 and 180 spaced apart for receiving the U-bolt 162.

The fitting 160, U-bolt 162 and locknuts 164 form part of the inboard spring mounting means 114. Also forming part of the mounting means 114, and also comprising spring preloading means 182, are first and second externally threaded sleeves 184 and 186, respectively. On assembly, the sleeves 184 and 186 are fixed, respectively, as by welding, brazing or swaging, to inboard ends of the first and second spring elements 110 and 112, pass through the bulkhead fitting apertures 168 and 170, respectively, being adjustably fixed against transverse axial movement by four locknuts 188 which enable spring preloading.

Configuration of the bulkhead fitting 160 and location of the spring connecting apertures 168 and 170 is ordinarily at least somewhat dependent upon steering gear configuration. It may thus often be desirable to form more than more than two, foreaft spaced mounting apertures 168 and 170 through the fitting leg 166, so as to provide for alternate locations for receiving the spring ends, a more universal type bulkhead fitting being therey provided. However, to prevent interference with pre-existing vehicle structure during turns the fore-aft length of the bulkhead fitting 160 is preferably limited to only a few inches. Accordingly, different fittings 160 may be required for different vehicles or types of vehicles 14.

Connection of outboard ends of the two spring elements 110 and 112 to the steering arm 50 is by the outboard connecting means 116, which comprises a rigid flat metal plate 194, a U-bolt 196 and locknuts 198. Two plate apertures 200, formed generally on a plate diagonal are provided for receiving the U-bolt 196. First and second apertures 202 and 204, respectively, are formed through the plate 194, intermediate the U-bolt apertures 200, for upwardly receiving the first and second spring ends 132 and 154. After assembly, outboard end regions of the spring elements 110 and 112 are retainably held between the plate 194 and the steering arm 50.

As depicted in FIG. 5, the outboard spring connecting means 116 is configured so that the spring ends 132 and 154 are transversely offset from each other by a distance, $d_3$, when the left wheel 54 is in a straight ahead position, such ends being also offset a distance, $d_4$, in a fore-aft direction. Preferably the fore-aft offset distance, $d_4$, is approximately equal to a fore-aft offset distance, $d_5$, between inboard spring ends; that is, to spacing between the apertures 168 and 170.

Depending upon the vehicle type and configuration, as well as upon spring loading characteristics required, the transverse offset distance, $d_3$, between the inboard spring ends may be from about 0.125 inch (0.3175 cm) to one inch (2.54 cm). Typically, the fore-aft spacings $d_4$ and $d_5$ are about one to one and a half inches (2.54–3.81 cm).

Configuration of the right apparatus portion 82 (FIG. 1) is a mirror image to the above described left portion 80. Hence, no separate description of the right portion 82 is provided herein.

Assuming typical steering gear configuration, as shown in FIGS. 3 and 5, a steering angle, $\theta$, between centerlines 212 and 214, respectively, of the interconnected left steering arm 50 and tie rod 44, necessarily changes as the left wheel 54 is swivelled in either side-to-side direction during a vehicle turn. In a left turn, during which the wheel 54 is turned outwardly in the direction of Arrow A, the steering angle, $\theta$, increases, causing pulling or tension forces to be applied to the spring elements 110 and 112. Conversely, in a right turn, the left wheel 54 is swivelled inwardly in the direction of arrow B, thereby reducing the steering angle, $\theta$, and causing pushing or compressional forces on the spring elements 110 and 112.

Consequently, in a left turn, with the left front wheel 54 the inside wheel, tension on the spring element 110 tends to increase the separation, $d_1$, between ends of the corresponding lever arms 124 and 126. Because of the transverse arm cross-over arrangement of the spring element 112, this pulling in the left turn causes the distance, $d_2$, between the corresponding lever arms 144 and 146 to decrease. Tension or pull on the second spring element transverse arms 150 and 152 thus causes a closing or compression of the spring proportion 142, which is opposite action on the first spring element 110.

In a right turn the left wheel 54 is the outside wheel and opposite loading occurs. Compression forces on the first spring element 110 tend to close or compress the spring portion 122. The simultaneous compression on the second spring element arms 150 and 152 causes an opening or tension of the corresponding second portion 142.

Thus, in either left or right turns, the two left spring elements 110 and 112 always act in mutual opposition. By similar analysis, corresponding right first and second spring elements 216 and 218 associated with the right apparatus portion 82 (FIG. 1) are also always seen to act always in opposition to each other. Furthermore, in any turn condition, it can be seen that the two first spring elements 110 and 216 are always oppositely loaded, as are the two second elements spring elements 112 and 218.

Loading of the four spring elements 110, 112, 216 and 218, by change of steering angle, $\theta$, during turning of the vehicle 14 creates restoring forces in the spring elements which, assuming the steering wheel is held in position for a turn, and as described below, urge the respective wheels 54 and 72 into the turn against road forces, by taking up tie rod tolerances. When the steering wheel is released, these spring forces urge the front wheels 54 and 72 back toward a straight ahead position, the spring elements then performing the conventional function of wheel caster, camber, etc. without the adverse steering control instabilities and tire wear associated therewith.

Very importantly, by varying the amount of spring element preloading by the preloading means 182 and the inboard mounting means 114 and by configuration of the outboard mounting means 116 (and of corresponding preloading and mounting means, not identified, of the right portion 82, the restoring forces provided by the spring elements 110, 112, 216 and 218 can be preprogrammed over a wide range according to desired or requirements for steering control and return-to-center (including return to selected non-centering).

For example, the first spring elements 110 and 216 can be preloaded sufficiently (with the wheels 54 and 72 straight ahead) in a push or compressional direction and the second spring 112 and 218 preloaded sufficiently in a pull direction, so that all four of the spring elements will always have the spring portions (for example portions 122 and 142), the elements 110 and 112) operating in a compressional or coil closing mode regardless of the direction of wheel turn and extent of steering angle, $\theta$, change.

To this end, the spring element 110 is preloaded, by adjusting the locknuts 188 in a push direction to an extent that when the steering angle, $\theta$, subsequently increases in a left turn, the preloading is never entirely unloaded. In a right turn, with $\theta$ decreasing, however, an additional push load is applied to the spring element A corresponding pull preload is similarly applied to the second, pull spring element 112.

Under such preloading, all the spring elements 110, 112, 216 and 218 are caused to always operate in either an unloading or additional loading mode, regardless of the amount and direction of turn. An important effect of preloading the spring elements 110, 112, 216 and 218 in this manner is that the spring elements never pass through, or operate at, zero load conditions which would tend to adversely affect steering control by allowing, for example, ball joint wear and tolerances to come into effect, as discussed below.

An illustrative example of the manner in which offset spring element mounting and selective preloading of the spring elements 110, 112, 216 and 218 (by the mounting means 114 and 116 and the preloading means 182 and corresponding means of the right portion 82) to provide good steering control in turns is given below after a review of normal wheel forces in a turn.

Road forces transmitted to the front, steerable wheels are generally known to be unequal on the two wheels. Because of inherent toe-out on turn of the outside wheel of a turn (defined above in conjunction with FIG. 2e) the outside wheel tends to "bulldoze" or "snow plow", thereby causing forces which act to increase the tow-out and force the wheel back towards the straight ahead position. As a result, the outside wheel is dragged through the turn, with tire tread slippage, and reduced steering control, particularly on slippery roads, and with increased tire wear.

All heretofore available, spring-type steering control enhancement devices known to the applicant, (for example, those disclosed in the above cited patents) actually result in greater spring forces being applied to the tie rod joint of the inside wheel than to that of the outside wheel of the turn where it is most needed. Ordinarily this is because the inside wheel is turned more sharply than the outside wheel in any turn, and in apparatus using pairs of opposing springs at each wheel, one of the inside wheel springs is more greatly compressed than the corresponding outside wheel spring while the other inside wheel spring is completely unloaded. Accordingly, known steering control enhancement devices are considered to actually decrease steering control in tight turns when a good steering control is most needed.

As an illustrative example, with no limitations intended or implied, FIG. 6 depicts results of mounting and preloading the programmable steering control apparatus 10 in a particular manner selected to always provide substantially greater spring forces on the outside wheel tie rod-steering arm ball joint than on the corresponding ball joint associated with the inside wheel of the turn, as is necessary to overcome normal wheel forces.

An exemplary spring loading curve 230 is shown in FIG. 6a for the below described configuration of the spring elements 110 and 112 (and of the corresponding right hand spring elements 216 and 218), which has been found advantageous for many types of vehicles. A 5% tolerance region or band width 232, is shown associated with the load curve 230.

To obtain the load curve 230 of FIG. 6a, spring deflection was measured for various spring closing loads on the spring elements 110 and 112. The test spring elements were constructed of 0.235 (0.597 cm) diameter, type 1090 carbon steel, plastic coated music wire. Diameter of the 1½ coils forming the spring portions 122 and 142 was 1¼ inches (3.175 cm) and lengths, $l_1$ and $l_2$ of the coil lever arms 124, 126 and 144, 146 were made equal at 2½ inches (6/35 cm). As indicated by diagramatic sketches of the spring elements 110 and 112 to the right of the load curve 230 in FIG. 6a the load curve plots load (in pounds) vs. transverse displacement of forward ends of the lever arms 124, 126 and 144, 146 towards one another from the unloaded separation distance, $d_1$ and $d_2$ (FIG. 4).

Accordingly, as mentioned above, the load curve 230 is for a coil closing or compressing direction only, since the spring elements 110 and 112 are, for the example given, preloaded and operated only in the compression or coil closing mode. As such, the curve 230 represents push loading on the first spring element 110 and pull loading on the second spring element 112. As can be appreciated, a similar curve could similarly be generated for operation of the spring elements 110 and 112 in a coil opening or a tension mode, and a short region 234 of such curve is shown for illustrative purposes to the left of the curve 230.

For this exemplary illustration, each of the spring elements 110 and 112 (and 216 and 218) are assumed to equally preloaded, in a wheel straight ahead condition, to about 1 inch (2.54 cm) of deflection, corresponding to a load of approximately 125 lbs. For convenience, a preload axis 236 is shown drawn upwardly through the curve 230 at this preload condition, subsequent spring lever arm deflections in operation being measured from this preload axis of deflection. When either of the spring elements 110 and 112 are additionally loaded by the vehicle turning, the effect is to move along the load curve 230, upwardly to the right in a direction of Arrow "C". Spring unloading during vehicle turns has the effect of moving along the curve 230 downwardly to the left in a direction of Arrow "D".

Because of the assumed equal preloading on all four spring elements 110, 112, 216 and 218, when the front wheels 54 and 72 are in a straight ahead position (the wheel position for preloading) forces due to the spring elements cancel out and no turning forces are provided thereby. Alternatively, by providing unequal loading of the spring elements 110, 112, 216 and 218 spring forces urging the front wheels 54 and 72 to a nonstraight ahead position can easily be provided as may be desired or required for some types of vehicles. For example, some types of trucks may be required to veer off the right side of the road in a "hands off" situation so as to prevent accidental crossing of the center line into on coming traffic in the event the driver falls asleep or becomes incapicated.

As can be seen from the exemplary load curve 230 and an examination of spring element configuration, whenever a turn applies a common pull or push deflection to both the spring elements 110 and 112 (or the corresponding spring elements 216 and 218), one of the elements is always loaded more heavily, while the other element always starts unloading. The load curve 230 also indicates that over a fairly wide deflection range on either side of the preload axis 236 and for a given spring element deflection, the rates of load increase and load decrease are approximately equal. For example, a deflection of ¼ inch (0.635 cm.) in the load direction can be seen to increase the load from the 125 lbs. preload by about three times to approximately 375 lbs. A similar ¼ inch deflection in the unload direction is seen to decrease the load from the 125 lb. preload by about one-third, to approximately 40 lbs.

Assuming an offset distance, $d_3$, between the outboard spring ends 132 and 154 of approximately ⅛ inch (0.3175 cm.), as provided by configuration of the outboard mounting means 116 (FIGS. 4 and 5) FIG. 6b shows measured spring lever arm deflections in a full left turn for the spring elements 110 and 112 from which the load curve 230 was derived. For purposes of obtaining the turn deflection data of FIG. 6b (and of FIG. 6c, as described below), the programmable steering control apparatus was installed on a 1979 Datsun type 810 station wagon.

Figure 7:
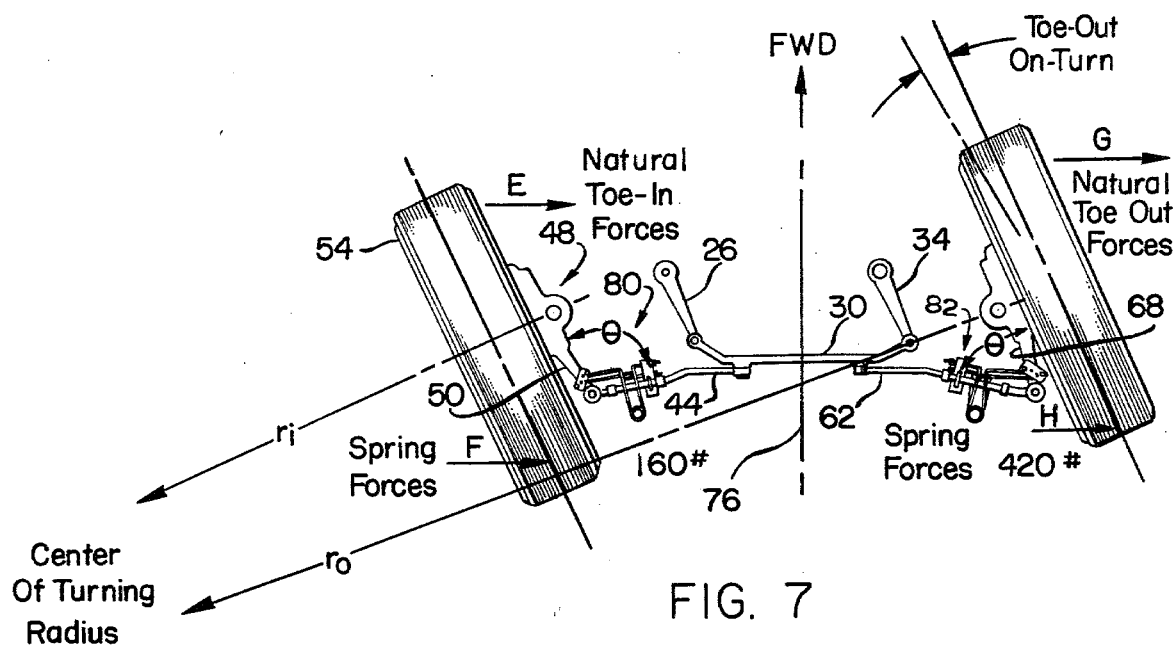
FIG. 7 is a pictorial plan view of the steering gear of the exemplary vehicle, illustrating wheel forces during a left turn and showing forces applied to the steering gear by the programmable steering control apparatus.

In the full left turn associated with FIG. 6b, a "pull" was applied to both the spring elements 110 and 112, the steering arm-tie rod angle, $\theta$, increasing, and the first spring element 110 was found to be pulled open by approximately ⅜ of an inch (0.952 cm.) and unloaded from the preload of 125 lbs. to about 40 lbs. (FIG. 6a). Simultaneously, the second spring element 112 was additionally pulled closed by approximately ⅛ of an inch (0.317 cm.) and loaded from the 125 lbs. preload to about 200 lbs. A net spring pulling force of about 160 lbs. was thus provided for pulling the rearward end of the left steering arm 50 toward the tie rod 44 (direction of Arrow "E", FIGS. 6b and 7) to take up tolerances and wear in the steering arm-tie rod ball joint 46. This 160 lb. spring pulling force is in a direction to counteract road forces which act (in the direction of Arrow "F") to pull the steering arm 50 away from the tie rod 44 to create a tow-in condition.

Although the tolerances and wear on the ball joint 46 may be only about 0.025–0.094 inches (0.064–0.239 cm.), the effect of the 160 lbs. pulling force by the spring elements 110 and 112 on the steering arm 50, against wheel toe-in forces from the road, importantly provides greatly improved tracking of the left wheel 54, with correspondingly improved steering control.

In a right turn (FIG. 6c), in which the left wheel 54 is the outside wheel, a pushing force is applied to both the exemplary spring elements 110 and 112; however, the net spring forces on the ball joint 46 are much greater than in a left turn. The first spring element 110 is compressed an additional approximate ⅜ of an inch (0.953 cm) thereby, as seen from FIG. 6a, additionally loading the spring element to about 450 lbs. Simultaneously, the second spring element is opened approximately ½ inch (1.27 cm) being thereby unloaded down to about 30 lbs. This results in a net pushing force of about 420 lbs. being applied to a rearward end of the steering arm 54.

Effect of this 420 lb. spring pushing force is to take up tolerances and wear in the steering arm-tie rod ball joint 46 by pushing the steering arm 50 outwardly away from the tie rod 44.

The above described inherent toe-out on turn of the outside wheel in a turn creates a "bulldozer" or "snow plow" effect which results in strong wheel forces acting in a direction of Arrow "H" to push the outside wheel into an even greater toe-out condition. This toe-out wheel force is, however, counteracted by the net 420 lbs. of spring force provided by the spring elements 110 and 112, with a 4–6 inch (10.16 to 15.24 cm) arm provided by the associated steering arm 50, which tends to push the outside wheel to the extent enabled by the ball joint wear and tolerances, back in a toe-in direction (direction of Arrow "H"). As a direct result, outside wheel tracking is greatly improved with further substantial improvement in steering control.

By providing the offset distance, $d_3$, to outboard ends of the spring elements 110 and 112 by the outboard mounting means 116, and by similarly mounting the right spring elements 216 and 218, substantially non-symmetrical spring loading occurs in left and right turns and a much greater spring force is provided in a turn to the steering arm-tie rod ball joint of the outside wheel than is applied to the inside wheel. Also, the spring force on the outside wheel acts in a direction pushing the outside wheel in a toe-in direction; whereas, the spring force on the inside wheel acts in a direction pulling the inside wheel in a toe-out direction.

These spring forces and directions are entirely consistent with effectively countering typical road forces tending to cause the inside wheel of the turn to toe-in and the typically much greater road forces tending to cause more toe-out of the outside wheel.

With the above described apparatus 10 configuration and preloading, neither of the spring elements 110 and 112 (or the corresponding right spring elements 216 and 218) are ever completely unloaded during a full turn in either direction and, preferably, the minimum spring load is in or above the 30 to 40 lb range. As above mentioned, this enables avoiding the relatively shallow region of the load curve 230 around a zero load point, wherein spring loading tends to be relatively more difficult to predict and control.

Figure 8:
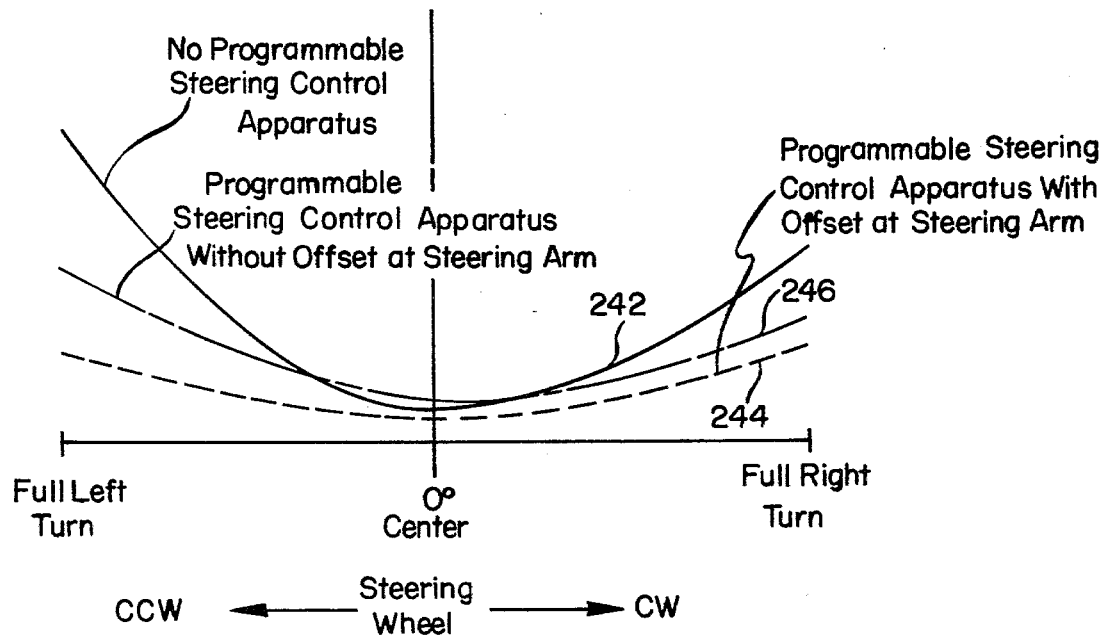
FIG. 8 is a graphical representation comparing typical conventional steering wheel forces with those corresponding to the programmable steering control apparatus.

By way of further illustrating the beneficial effects of the above described programmed steering control apparatus 10, FIG. 8 plots typical relative steering wheel forces or effort throughout the entire vehicle steering range for several conditions. A first curve 242 depicts typical steering wheel forces associated with vehicles provided steering control by front wheel caster, camber, toe-in and steering axis inclination. Curve 242 indicates that left turns typically require greater steering effort because of the shorter moment arm between the pitman arm 26 and the left wheel 54 than between the pitman arm and the right wheel 72 (reference FIG. 1).

A second curve 244 of FIG. 8 depicts the relative reduction of required steering effort by use of the programmed steering control apparatus 10, with zero settings of front wheel caster, camber, toe-in and steering axis inclination. Curve 244 also shows that the apparatus 10 causes the left and right turn steering effort to be relatively symmetrical about a zero turn center.

An intermediate curve 246 depicts steering effort typically expected by use of the apparatus 10 but without the above described outboard spring end offset, $d_3$, which is provided by the outboard mounting means 116 (FIG. 4) and corresponding outboard mounting means of the apparatus right portion 82. Without this outboard spring offset, $d_3$, inside and outside wheel spring forces in turns are typically the same. Although many of the benefits of the apparatus 10 are still provided with no offset, $d_3$, the optimum benefit of providing substantially greater spring force at the outside wheel is normally not attained. As a result, the non-symmetrical steering effort depicted in curve 246 is expected, steering effort in the left turns being somewhat greater than in right turns.

It is emphasized that after installation of the apparatus 10, by selectively preloading the spring elements 110, 112, 216 and 218 and by selectively varying the spring element outboard end offset, $d_3$, for a given spring element and mounting configuration relatively wide ranges of spring forces can be provided in turns to whichever wheels are the inside and outside wheels. These load variations may be programmed in accordance with particular vehicle requirements, including such factors as vehicle weight and expected driving conditions. For example, different spring forces in turns are expected to be necessary for sports cars, trucks and off-road vehicles such as tractors, pick-up trucks and 4-wheel drive vehicles.

If, for example, it is desirable or necessary to provide greater spring force to the inside wheel than to the outside wheen of a turn, the offset distance, $d_3$, (FIG. 5) can be reversed so as to position the outboard end 132 of the first spring element 110 outboard of the corresponding end 154 of the second spring element 112. Spring force variations on the spring elements 110, 112, 216 and 218 can also, or alternatively, be provided by changing wire diameter, lever arm length and/or number or diameter of coil portions of all or opposing pairs of the spring elements. By making such variations in construction, the first spring elements 110 and 216 and the second spring elements 112 and 218 may be provided with load curves different from that shown in FIGS. 6a and also different from one another.

Although the programmable steering control apparatus 10 has been shown, and described above, as installed between both the arms 50 and 68 and the corresponding tie rods 44 and 62, across the respective tie rod joints 46 and 66, alternative spring element installations on the steering gear 12, however, with generally reduced effectiveness, are possible and are thus within the scope of the present invention.

As an illustration, approximately sixty percent of the benefit of the described apparatus 10 is expected to be attained by installing only a single pair of the first and second spring elements 110, 216, or 112, 218 on only one of the steering arm-tie rod sets 50, 44 or 68, 62, and across only one of the corresponding tie rod joints 44 or 46. Such installation of a single pair of first and second spring elements 110 and 112 includes, for example, because of space limitations, one of the elements between one of the pairs of tie rods and steering arm and the other element between the other tie rod-steering arm pair. Offset ($d_3$) and preloading in an installation of this type would be the same as if both the spring elements were on the same tie rod-steering arm pair.

And by alternatively installing two pairs of spring elements similar to the described pairs 110, 216 and 112, 218 between the steering pitman arm 26 and the relay rod 30 and between the idler arm 34 and the relay rod, across the corresponding ball joints 28 and 32, it is estimated that about thirty percent of the benefit obtained from the described steering arm-tie rod installation can be achieved.

About ten percent of the maximum benefit can be expected by installing similar spring elements between only the pitman arm 26 and the relay rod 30, or between the relay rod and inboard ends of both the tie rods 44 and 62 (across the ball joint connections 42 and 64). In general, the most effective installation is on both sides of the vehicle as close to the wheels 54 and 72 as possible, as in the case of the steering arm-tie rod installation described. Effectiveness is reduced as distance of installation from the steerable wheels towards the pitman arm is increased.

It is also to be appreciated that variations in configuration of the spring elements 110 and 112 (and 216, 218) as well as configuration of the mounting means 114 and 116, may be necessary or desirable to enable installation of the apparatus 10 on different makes and models of vehicles, according to configuration of the steering gear 12 and clearances in regions of installation. Also, when provided as original equipment on the vehicles, the mounting means 114 and 116 may, for example, be built into, or made part of, the steering arms and tie rods or otherwise constructed to be more integral with the steering gear structure.

And although the programmable steering control apparatus 10 has been shown and described as installed on front end regions of the vehicle 14, since front end steering is normally provided in vehicles, the apparatus 10 may similarly be installed on rear ends of vehicles having rear wheel steering, such as may be found on some types of commercial vehicles.

Although there has been described above a specific arrangement of a programmable steering control apparatus for motor vehicles, in accordance with the invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Programmable steering control apparatus, for motor vehicles having steering gear which includes a plurality of steering linkages interconnected between a steering wheel or the like and one or more steerable wheels, said apparatus comprising:
    (a) spring means adapted for causing steering control and steerable wheel return-to-center biasing for a motor vehicle, said spring means comprising first and second spring elements;
    (b) means for attaching said first spring element between an adjacent pair of the vehicle steering gear linkages and for attaching the second spring element between an adjacent pair of vehicle steering gear linkages, said attaching means including offsetting means enabling nonsymmetrical spring element deflection during opposite turns of the steerable wheels; and
    (c) means for preloading the spring elements to selected separate preload levels enabling, in any turn of the steerable wheels, one of the spring elements to partially unload from the preloaded level associated therewith and the other one of the spring elements to load more heavily from the preload level associated therewith.

2. The programmable steering control apparatus according to claim 1, wherein the offsetting means and the preloading means cooperate for selectively enabling the amount of unloading of one of the elements in a given amount of turn of the steerable wheels in one direction to be unequal to the amount of greater loading of said one spring element for the same amount of steerable wheel turn in the opposite direction.

3. The programmable steering control apparatus according to claim 1, wherein the attaching means attaches both the spring elements in parallel, between the same pair of steering gear linkages.

4. The programmable steering control apparatus according to claim 1, wherein the preloading means enables tension and compression preloads to be applied to ends of the spring elements according to the required steering control and return-to-center characteristics.

5. The programmable steering control apparatus according to claim 1, wherein the offsetting means includes means causing preselected relative positional offsetting of corresponding ends of the spring elements.

6. The programmable steering control apparatus according to claim 1 in which the vehicle includes left and right steerable wheels and in which the steering gear includes left and right steering knuckle arms fixed, respectively, to the left and right steerable wheels and left and right tie rods pivotally connected, respectively, to the left and right steering arms; wherein the spring means comprises left and right pairs of said first and second spring elements and said attaching means attaches the left pair of first and second spring elements in parallel between the left steering arm and left tie rod and the right pair of first and second spring elements between the right steering rod and right tie rod.

7. Programmable steering control apparatus for motor vehicles having left and right steerable wheels, left and right steering arms connected, respectively, to the left and right steerable wheels, left and right tie rods pivotally connected to ends of the first and second steering arms and wheel steering linkages connected to the tie rods, said apparatus comprising:
  (a) a pair of first spring elements, each of said first spring elements having tangentially loaded, helical spring coils with attachment ends connected thereto, said first spring element attachment ends being configured to cause opening of said coils in response to said ends being pulled apart and closing of said coils in response to said ends being pushed together;
  (b) a pair of second spring elements, such of said spring elements having tangentially loaded, helical spring coils with attachment ends connected thereto, said second spring element attachment ends being configured to cause closing of said coils in response to said ends being pulled apart and opening of the coils in response to said ends being pushed together;
  (c) means for connecting one each of the first and second spring elemens, in mutual parallel relationship, between the left steering arm and left tie rod and the other one each of the first and second spring elements, in mutual parallel relationship, between the right steering arm and right tie rod, to cause, when the wheels are swiveled from one turn direction to the other turn directional change in loading of the spring elements between push and pull loading; and
  (d) means for selectively preloading said first and second spring elements after said spring elements are connected between the steering arm and the tie rods for enabling, when one of the spring elements connected between one of the steering arms and tie rods is unloaded from the selected preload thereof by swiveling of the wheels, the spring element connected in parallel therewith is loaded more heavily from the selected preload thereof.

8. The programmable steering control apparatus according to claim 7, wherein the spring element connecting means connects the spring elements between the steering arms and tie rods for causing the connecting ends of the spring elements associated with the inside wheel of a turn to be pulled apart and the connecting ends of the spring elements associated with the outside wheel of a turn to be pushed together.

9. The programmable steering control apparatus according to claim 7, wherein the spring element connecting means includes means for offsetting, in a side-to-side direction, one pair of corresponding connecting ends of each pair of the spring elements for enabling preselected, nonsymmetrical spring loading and unloading characteristics in opposite wheel turns.

10. The programmable steering control apparatus according to claim 9, wherein said preloading means and offsetting means enables preselected different spring element restoring forces on the inside and outside wheels in any turn.

11. The programmable steering control apparatus according to claim 10, wherein said preloading means and offsetting means enables the spring element restoring force on the outside wheel in any full turn to be at least about twice as great as the spring element restoring force on the inside wheel in said full turn.

12. The programmable steering control apparatus according to claim 7, wherein said spring elements and said preloading means enable return-to-center movement of the steerable wheels from a moving turn, in a hands-off condition, with zero settings of steerable wheel caster, camber, toe-in and steering axis inclination.

13. Programmable steering control apparatus for motor vehicles having left and right steerable wheels, left and right steering arms connected, respectively, to the left and right steerable wheels, left and right tie rods pivotally connected to ends of the first and second steering arms and wheel steering linkages connected to the tie rods, said apparatus comprising:
  (a) spring means adapted for causing steering control and steerable wheel return-to-center movement with zero wheel settings of caster, camber, toe-in and steering axis inclination,
    said spring means including two first, compression spring elements and two second, tension spring elements;
  (b) means for connecting a first pair of the first and second spring elements, in parallel, between the left steering arm and tie rod and for connecting a second pair of the first and second spring elements, in parallel, between the right steering arm and tie rod,
    said connecting means including offsetting means for offsetting, in a side-to-side direction, corresponding outboard ends of the first pair of spring elements and for similarly offsetting corresponding outboard ends of the second pair of spring elements; and
  (c) preloading means associated with inboard ends of the spring elements for enabling separate preloading of individual ones of the spring elements to preselected preload levels.

14. The programmable steering control apparatus according to claim 13, wherein said preloading means enables, in any turn of the steerable wheels, one of the first pair of spring elements and one of the second pair of spring elements to partially unload from preloaded levels thereof and the other ones of the first and second pairs of spring elements to load more heavily from preloaded levels thereof.

15. The programmable steering control apparatus according to claim 13, wherein said preloading means enables, in a left turn, partial unloading from preload levels of the first spring element of the first pair of spring elements and the second spring element of the second pair of spring elements and greater loading from preload levels of the other two spring elements, and, in a right turn, partial unloading from preload levels of the second spring element of the first pair of spring elements and the first spring element of the second pair of spring elements and greater loading from preload levels of the other two spring elements.

16. The programmable steering control apparatus according to claim 13, wherein said spring elements include tangentially loaded, helical spring coils having joined to opposite sides thereof generally parallel lever arms, said lever arms having orthogonally connected to ends thereof first and second connecting arms, said lever arms and connecting arms being generally in the plane of the spring coils.

17. The programmable steering control apparatus according to claim 16, wherein the first and second connecting arms of each of the first spring elements project, without crossing, in opposite directions and the first and second connecting arms of the second springs project in opposite directions with crossing.

18. The programmable steering control apparatus according to claim 17, wherein the connecting means causes, in any turn, the first and second connecting arms of both the first and second spring elements associated with one steerable wheel to be subjected to pulling forces, the spring coils of the first spring element tending thereby to be pulled open and the spring coils of second spring element tending thereby to be pulled closed, the connecting means also causing, in the same turn, the first and second spring elements associated with the other steerable wheel to be subjected to pushing forces, the spring coils of the first spring element tending thereby to be pushed closed and the spring coils of the second spring element tending to be pushed open.

19. The programmable steering control apparatus according to claim 18, wherein both the first spring elements are preloaded in a pushing direction tending to push the spring coils thereof closed and both the second spring elements are preloaded in a pulling direction tending to pull the spring coils thereof closed.

20. The programmable steering control apparatus according to claim 16, wherein the offsetting means and preloading means enable, in any turn, substantially greater spring restoring forces in the spring elements associated with the outside wheel of a turn than in spring elements associated with the inside wheel of the turn.

* * * * *